United States Patent
DeVaull, III et al.

(10) Patent No.: US 6,796,741 B1
(45) Date of Patent: Sep. 28, 2004

(54) IN-SITU BIOREMEDIATION PROCESS AND APPARATUS

(75) Inventors: George Ellis DeVaull, III, Houston, TX (US); Donald Lee Tharpe, Katy, TX (US); James Henry Miller, Katy, TX (US)

(73) Assignee: Shell Oil Company, Houston, TX (US)

(*) Notice: Subject to any disclaimer, the term of this patent is extended or adjusted under 35 U.S.C. 154(b) by 9 days.

(21) Appl. No.: 10/426,291

(22) Filed: Apr. 30, 2003

(51) Int. Cl.[7] .............................. B09C 1/08; F16K 15/00
(52) U.S. Cl. ............................ 405/128.5; 405/128.75; 137/516.13
(58) Field of Search ...................... 405/128.15, 128.45, 405/128.5, 128.7, 128.75; 588/205; 210/601; 137/511, 516.11, 516.13

(56) References Cited

U.S. PATENT DOCUMENTS

| | | | |
|---|---|---|---|
| 1,854,518 A | 4/1932 | Little | |
| 2,071,392 A | 2/1937 | Crowell | 166/1 |
| 2,248,124 A | 7/1941 | Scaramucci | 166/9 |
| RE22,483 E | 5/1944 | Burt | 166/1 |
| 2,763,222 A | 9/1956 | Herstedt | 111/7.3 |
| 2,853,833 A | 9/1958 | Hash | 47/57.5 |
| 3,077,166 A | 2/1963 | Delp | 111/7.3 |
| 3,166,034 A | 1/1965 | Haroldson et al. | 111/7.3 |
| 3,412,563 A | 11/1968 | Sharp, Jr. | 61/46.5 |
| 3,974,876 A * | 8/1976 | Taylor | 137/504 |
| 4,031,955 A * | 6/1977 | Ledet | 166/183 |
| 4,309,129 A | 1/1982 | Takahashi | 405/269 |
| 4,310,050 A * | 1/1982 | Bourgoyne, Jr. | 137/501 |
| 4,449,856 A | 5/1984 | Tokoro et al. | 405/269 |
| 4,694,908 A * | 9/1987 | Morris et al. | 166/310 |
| 4,710,063 A | 12/1987 | Faktus et al. | 405/269 |
| 4,817,739 A | 4/1989 | Jeter | 175/38 |
| 4,859,119 A | 8/1989 | Chida et al. | 405/269 |
| 5,560,737 A * | 10/1996 | Schuring et al. | 405/128.45 |
| 5,697,442 A | 12/1997 | Baldridge | 166/286 |
| 5,750,364 A | 5/1998 | Salanitro | 435/42 |
| 5,811,010 A | 9/1998 | Salanitro | 210/610 |
| 5,879,107 A * | 3/1999 | Kiest et al. | 405/128.5 |
| 5,902,734 A | 5/1999 | Salanitro | 435/42 |
| 6,109,485 A | 8/2000 | Amidzich | 222/400.7 |
| 6,238,906 B1 | 5/2001 | Salanitro | 435/262.5 |
| 6,503,395 B1 | 1/2003 | Salanitro | 210/610 |

* cited by examiner

Primary Examiner—Michael Safavi
(74) Attorney, Agent, or Firm—Y. Grace Tsang (57) ABSTRACT

A process and apparatus for the in-situ bioremediation of aquifers contaminated with chemicals by delivering a chemical degrading bacterial culture using a bacterial slurry delivery apparatus, which is designed to prevent backflow of soil and clogging of the apparatus, and a networked oxygen delivery system.

15 Claims, 3 Drawing Sheets

IN-SITU BIOREMEDIATION PROCESS AND APPARATUS

FIELD OF THE INVENTION

This invention relates to a process and an apparatus for in-situ bioremediation of a chemical contaminant in an aquifer. The invention further relates to a method of delivery bacterial culture in a subsurface, and an oxygen delivery system for the remediation of aquifers contaminated with a chemical compound such as methyl-t-butyl ether (MTBE).

BACKGROUND OF THE INVENTION

The 1990 Clean Air Act Amendments mandated that gasoline suppliers reformulate their gasoline blends to be cleaner burning, and to have less impact to the atmosphere. In response to this mandate, gasoline suppliers began to blend their fuels with oxygenate chemicals, such as alkyl ethers. In particular, methyl-tert-butyl ether (hereinafter "MTBE"), was used quite extensively, and often comprised up to 10 to 15% by volume of unleaded gasoline.

Now, having used oxygenated fuels for more than a decade, it has become clear that these cleaner-burning fuels pose great threats to groundwater resources. In particular, many oxygenate chemicals are very soluble in water and are slow to degrade in the environment; hence they tend to accumulate in water resources once released to the environment. For example, MTBE has been detected in groundwater with high frequency in many states and there are well-documented cases of impacts to municipal water supply wells. In some cases these impacts result from accidental gasoline spills; in other cases they are attributed to the re-deposition of chemicals emitted to the atmosphere from partially combusted automobile exhaust.

It is also now known that when oxygenate chemicals including alkyl ethers, such as MTBE and tertiary butyl alcohol (hereinafter "TBA"), are found in the subsurface, then they are resistant to biodegradation under natural conditions. This is the main reason for their persistence and accumulation in soil and groundwater.

With the increase in our knowledge of the behavior of these chemicals, and the increase in documented impacts, regulatory agencies are now vigorously enforcing cleanup standards for MTBE and TBA in groundwater. As a result, practitioners are searching for technologies that can clean-up soil and aquifers contaminated with oxygenates such as MTBE and TBA.

Shallow contaminated soil can be treated by excavating the contaminated soil and then treating it above-ground. However, in most cases, it is preferable to treat contaminated soils in-situ so as to minimize disturbance of the site and prevent further release of the contaminants to the atmosphere.

U.S. Pat. Nos. 5,750,364, 5,811,010, 5,902,734, and 6,238,906 assigned to Shell Oil Company, relate to utilizing mixed or single cell bacterial cultures for aerobically degrading alkylethers and TBA to non-toxic carbon dioxide and water. U.S. Pat. No. 6,503,395, assigned to Shell Oil Company, relates to the in-situ purification of ethers and/or alcohols. U.S. Pat. No. 6,503,395, assigned to Shell Oil Company, discloses a method of delivering oxygen the subsurface. However, in-situ remediation of sub-surface chemical contaminants by delivering contaminant-degrading aerobic bacteria to the sub-surface (this overall process will hereinafter be referred to as "bio-augmentation") has not historically been embraced by the practice. It is acknowledged that delivering and maintaining non-indigenous microorganism cultures in the subsurface is a very difficult task. Moreover, there is a need for an effective and economical method which would deliver optimal level of oxygen-containing gas to grow and maintain aerobic microorganisms as well as to supply oxygen required for bioremediation.

In operations for injecting biomass such as microorganism cultures in the subsurface for remediation, injection has typically been accomplished by using a hollow-core drill rod, such as a 1 to 2 inch diameter drill rod, with a disposable tip. The drill pipe is pushed into the soil using a direct-push system. In an attempt to avoid clogging, the drill pipe is pushed to the desired depth with a disposable tip, the drill pipe is withdrawn upward a few inches with the tip left in place. Then, injection of the biomass is begun, e.g. at a rate of approximately 5–20 gallons/minute, followed by withdrawal of the pipe upwards, e.g. from about 2 ft. to about 10 ft., and then a repeat of the injection. The operation is continued over the vertical zone to be treated.

A common occurrence is that, when the flow of biomass is discontinued, in order to pull the drill string upward or add more drill string or change connections, there is a backflow of fluidized soil and water into the injection ports and hollow drill pipe. This backflow clogs the injection ports and the pipe with soil particles. At this point, restarting the injection is impossible without withdrawing the drill string, clearing the soil plug or replacing the pipe, and starting over. In the field, slurry injection operations often suffer significant downtime, restricted operations, and failure due to this backflow of soil. Presently, there does not seem to be any tool available in technology relating to injecting biomass which addresses this problem.

In addition, there is a need for a system that permits the operator to inject every few feet starting, for example at the top of a water table and moving downward, or to move up and down. The current technology requires injection only as the drill pipe is withdrawn. A typical patented direct-push technology for environmental soil sampling is called Geoprobe™ and there are a number of commercially available sampling and injection systems available that use that technology.

Now, with the need to treat aquifers and soils contaminated with more recalcitrant chemicals, there is a need for a bio-augmentation process which can successfully deliver and maintain non-indigenous aerobic microorganism cultures which requires oxygen for growth and biodegradation, in the subsurface. More specifically, there is a need for an effective bio-augmentation process for remediating oxygenate chemicals such as alkyl ethers, particularly MTBE, and TBA contamination in soils and groundwater.

Now, with the need to treat aquifers and soils contaminated with more recalcitrant chemicals, there is a need for a bio-augmentation process which can successfully deliver and maintain non-indigenous microorganism cultures in the subsurface. More specifically, there is a need for an effective bio-augmentation process which effectively delivers oxygen and microorganisms for remediating oxygenate chemicals such as alkyl ethers, particularly MTBE, and TBA contamination in soils and groundwater.

SUMMARY OF THE INVENTION

This invention relates to a method and apparatus for the in-situ bioremediation of aquifers contaminated with chemical(s), particularly oxygenate chemicals such as MTBE, and/or t-butyl alcohol (TBA) by injecting into the aquifers a microbial culture that degrades said chemical(s) such as MTBE and/or t-butyl alcohol. In particular, the invention uses (a) a bacterial culture capable of aerobically degrading the target chemicals, (b) an apparatus for continuously or intermittently delivering bacterial culture to subsurface without backflow of soil and other materials into the injection pipe while not pumping or while making changes to the drill string, pump and hose attachments to the drill string, and (c) an oxygen delivery system injecting, by means of a network of at least two conduits which extend in and/or below the treatment zone, an oxygen-containing gas at a pressure of at least 5 psig (pounds per square inch gauge) above the hydrostatic pressure at each point of delivery, by pulsed injection, at a frequency in the range of from about once per week to about 10 times per day optimized so as to maximize aerobic biodegradation while maintaining less than 50%, preferably less than 10% volatilization of contaminants.

To reach the optimal delivery of the oxygen-containing gas, the injection frequency and volume at each injection point are adjusted to have the relationship according to the following equation:

$$e^{[(-V \times F \times N \times H)/(W \times B \times Q)]} > 0.50 \text{ (preferably} > 0.80, \text{ more preferably} > 0.90, \text{ still more preferably} > 0.93)$$

Wherein:

e=natural exponential

V=volume of gas injected at each injection point (ft3)

F=frequency of injections (number of injections per day)

N=number of gas injection points

W=width of treatment zone perpendicular to groundwater flow path (ft)

B=vertical thickness of treatment zone (ft)

Q=specific discharge of groundwater to treatment zone (ft/day)

H=Henry's Constant for contaminant of interest ((mg/L-water)/(mg/L-air))

DETAILED DESCRIPTION OF THE INVENTION

The present process successfully delivers and maintains microorganism cultures in subsurface utilizing a network/galleries of culture and/or oxygen-containing stream delivery apparatus.

The present invention, provides a process for remediating in-situ chemical, particularly oxygenate chemicals including alkyl ethers and alkyl alcohols, particularly branched alkyl ethers/alcohol's, more particularly tertiary alkyl ethers/alcohols, still more particularly MTBE and TBA contamination in soils and groundwater by delivering to the aquifers and/or soils a bacterial culture capable of degrading such chemicals, particularly oxygenate chemicals, more particularly branched alkyl ethers/alcohols such as MTBE and/or TBA, preferably to carbon dioxide and water, more preferably to carbon dioxide and water within 70 hours. The bacterial culture can be, but not limited to, an indigenous culture, collected and optionally enriched and/or grown to a larger quantity, from the contaminated site. Non-limiting and illustrative examples of the oxygenates include diethyl ether (DEE), dimethyl ether (DME), methyl ethyl ether (MEE), methyl n-propyl ether (MPE), ethyl n-propyl ether, methyl isopropyl ether, ethyl isopropyl ether, di-t-butyl ether, di-isopropyl ether (DIPE), di-isobutyl ether, isopropyl isobutyl ether, ethyl t-butyl ether (ETBE), t-amyl ethyl ether, t-amyl propyl ether, t-amyl isobutyl ether or methyl-t-amyl ether. As one aspect of the present invention, the bacterial culture delivered is a non-indigenous culture.

Figure 1:
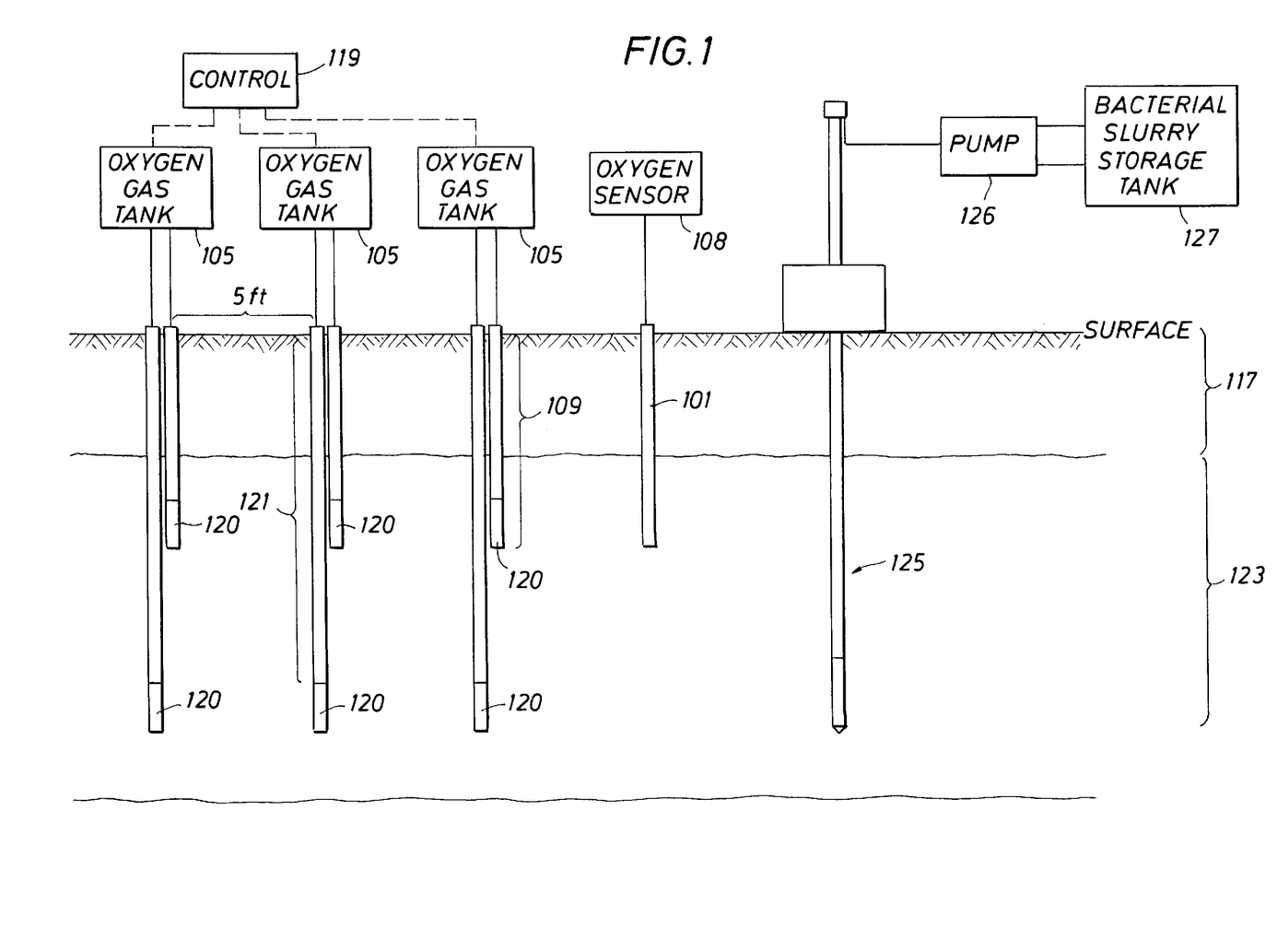
FIG. 1 is a cross-sectional view of an embodiment of this invention.

Referring to FIG. 1, To ensure effective bioremediation, bacterial slurry is injected along the length of the treatment zone either consecutively or simultaneously. Dependent upon the width of the treatment zone, the injection may also be conducted along the width as well as the length of the treatment zone in a scheme which resembles a grid. Illustrative non-limiting examples include injecting every few feet, such as about every 0.5–10 feet, particularly every 1 to 4 feet, perpendicular to the ground water flow. The injection pipe apparatus 125 is preferably driven down to the bottom of the target treatment zone and then slowly raised and injection is made, for example, about every 0.5–10, particularly every 1–4 ft, as the bacterial culture was injected under pressure via a specifically designed pump 126. Alternatively, the injection apparatus can be driven down to the top of the target treatment zone 123 and then slowly lowered to the bottom of the treatment zone 123, or the injection apparatus can be driven down to any point within the depth of the treatment zone 123 and move up and down as needed.

As a specific embodiment of the present invention, nutrients are also injected to the treatment site to enhance biodegradation. Injection of nutrients and/or bacteria can be made through the oxygen-containing gas injection wells, monitoring wells, or separate wells designed for bacterial slurry injections only.

As one specific embodiment of the present invention, a process for remediating MTBE and/or TBA in the aquifer (groundwater, saturated zone, water-bearing zone, sub-soil) is provided using the present injection apparatus for injecting to the treatment zone 123 a mixed bacterial culture or pure bacterial culture described in U.S. Pat. No. 5,750,364, U.S. Pat. No. 5,811,010, U.S. Pat. No. 5,902,734 and U.S. Pat. No. 6,238,906 assigned to Shell Oil Company, the descriptions of these patents are herein incorporated by reference. As an illustrative non-limiting example, the injection concentrations are from about 200 to about 6,000 mg dry weight of bacterial cells per liter of solutions, and from about 100 mg to about 1000 mg dry weight of biosludge per kilograms of soil to be treated.

Where MTBE remediation using the mixed bacterial culture disclosed in U.S. Pat. No. 5,750,364, ATCC Number 202057, is conducted, the concentration of the bacterial culture used is for example more than 100 mg, particularly greater than 200 mg, more particularly greater than 250 mg, dry wt of cells/kg of soil. The culture is capable of degrading MTBE and TBA to carbon dioxide and oxygen.

The concentration of the culture contained in the injection slurry is generally within the range 100–10,000 mg/L, preferably about 200–5000 mg/L, and still more preferably about 500–4000 mg/L.

The amount and concentration of the bacterial culture delivered and contained in the treated zone will depend on the strength and activity of the culture as well as the concentration of the contaminant(s) in the targeted treatment zone. For example, it can be from about 100 mg to 1000 mg dry weight of biosludge injected per kilogram of soil.

A novel apparatus and process is utilized for the delivery of bacterial slurry to point(s) underground that can inject while moving up or down. It is specifically designed to prevent backflow of soil and fluid into the injection apparatus, as well as avoid clogging of the apparatus by soil and sand. The apparatus is characterized by rugged construction, minimal moving parts, ease of cleaning, an enclosed bottom such as a tip, and the capability of maintaining a fluid or slurry column in said drill pipe within the in-soil hollow drill pipe while pump connections and injection pipe extensions are changed at the surface.

The present injection apparatus is a valve assembly which comprises a (1) hollow pipe closed at one end having exit ports in the wall; and inside of the pipe (2) a plug, (3) optional a seat, and (4) a spring attached to both the plug and the closed end of the hollow pipe.

Figure 2:
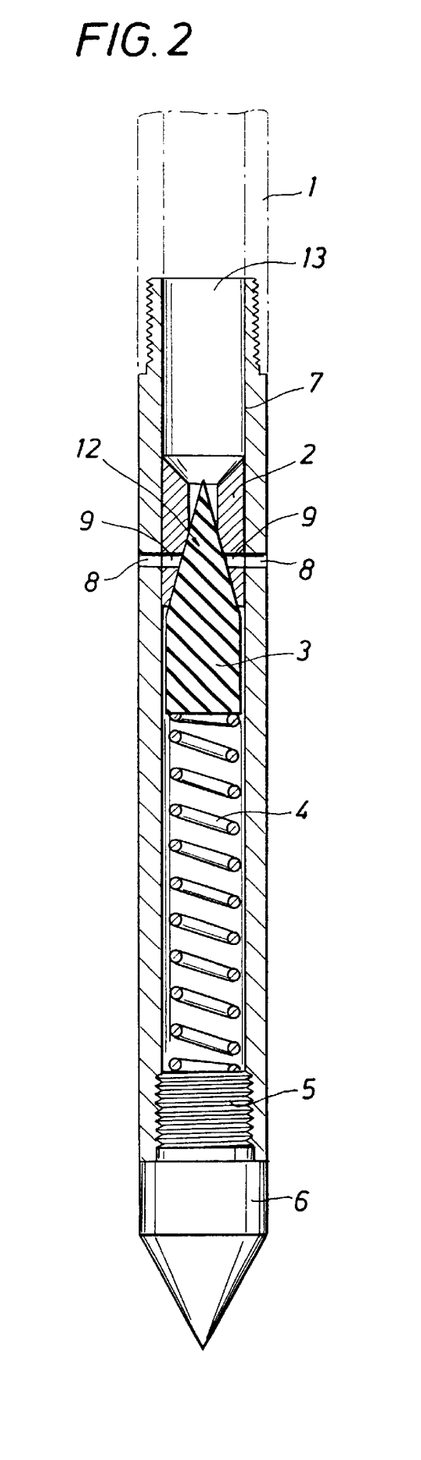
FIG. 2 is a longitudinal cross section of the injection apparatus of the first embodiment of the present invention relating to the slurry injection apparatus, wherein the valve seat having exit ports aligned with the ports in the wall of the hollow pipe and the ports are closed.
Figure 3:
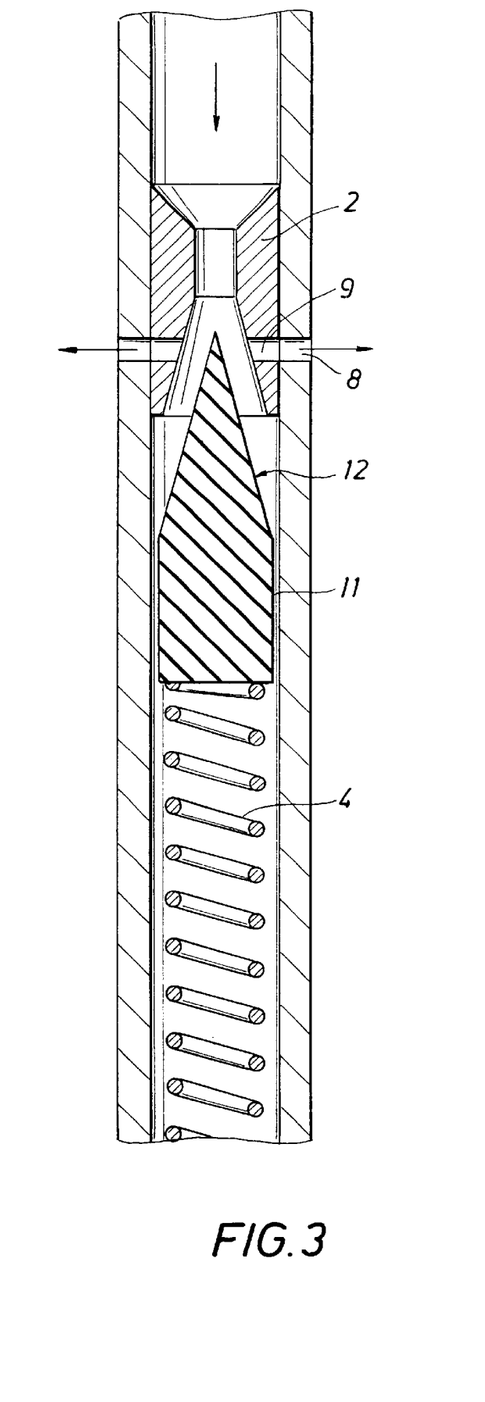
FIG. 3 is a fragmentary longitudinal cross-sectional view of the injection apparatus of FIG. 2 shown in a position for the injection of fluid wherein ports are open for injection of fluid.

Referring to FIG. 2, the present process uses an apparatus, according to the first embodiment of the present invention relating to the injection apparatus, which comprises a seat or valve seat 2, plug 3, spring 4, and a tip 6, within a hollow pipe 7, and is attached to a drill string pipe 1. Bacterial slurry to be injected pass through flow ports in the valve seat before exit through ports in the wall of the hollow pipe. There are exit ports drilled in the wall of the hollow pipe, one represented by 8. There are flow ports 9 in the valve seat 2 that is aligned with the exit port(s) 8 in the wall of the hollow pipe. The radial flow ports are either on the tapered section of the valve seat (as shown in FIGS. 2, 3, 4 and 6 or on the section upper from the tapered section. As an illustrative non-limiting example, the lower end of the pipe is closed with a tip 6 attached to the hollow pipe by a screw 5, which may either be a part of the tip 6 or be attached to the tip 6.

Figure 5:
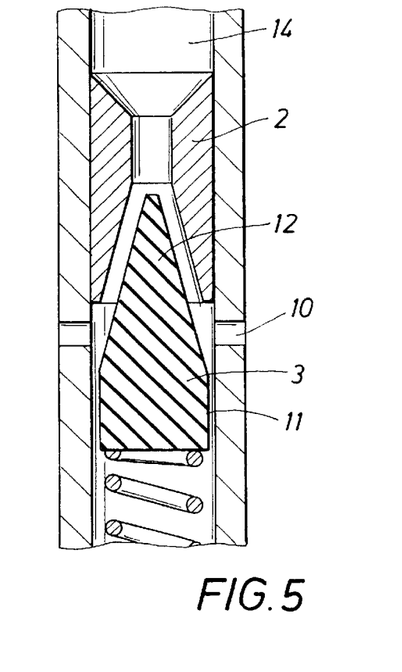
FIG. 5 is a fragmentary longitudinal cross-sectional view of the second embodiment of the present invention, wherein the ports in the wall of the hollow pipe are located below the valve seat.
Figure 6:
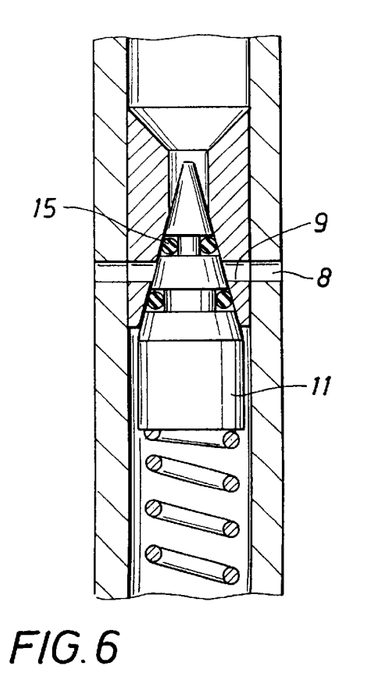
FIG. 6 is a fragmentary longitudinal cross-sectional view of a specific arrangement of the first embodiment of the present invention, wherein the grooves for inserting o-rings are part of the plug.
Figure 7:
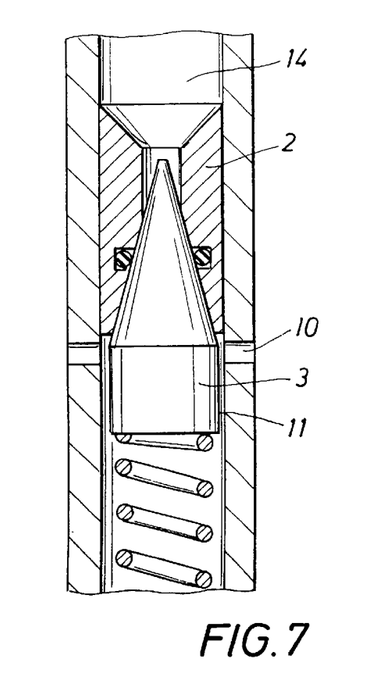
FIG. 7 is a fragmentary longitudinal cross-sectional view of a specific arrangement of the second embodiment of the present invention, wherein grooves for inserting o-rings are part of the valve seat.

Referring to FIG. 5 and FIG. 7, in the second embodiment of the present invention relating to the injection apparatus, the apparatus does not have any flow port in the valve seats 2, and there are exit ports 10 through the peripheral wall of the pipe, directly below the valve seat 2 in an area that will be completely covered by the extended cylindrical section 11 of the plug 3.

The valve assembly apparatus can be attached to any injection pipe, such as drill pipes or a drill string. The hollow pipe of the present apparatus has an open end 13 adapted to receive fluids, and a closed end 6. The invention is demonstrated by screwing the present inventive injection apparatus via the open end of the hollow pipe on to the end of a drill string 1. The drill string pipe 1 is made of a material suitable to withstand hydraulic hammering forces of emplacement and of sufficient tensile strength to withstand hydraulic hammering forces of withdrawal, typically having a Brinnell hardness of about 100 or more according to ASTM Methods E10, E18, E93, and E140 as relevant, or equivalents thereof, such as high strength steel, e.g. carbon steel, and each is from about 1 to about 20 feet, particularly from about 2 to about 6 feet long.

Depending on the properties of the slurry to be injection as well as soil or sand encountered, the dimensions of the drill pipe can vary, as will be apparent to those skilled in the art. For most situations, a suitable diameter is in the range of from about 0.6 to about 36 centimeters, particularly from about 1.2 to about 13 centimeters, more particularly from about 4 centimeters to about 8 centimeters. In demonstrating the invention, a drill pipe having a diameter of about 1.9 centimeters performed well.

The length of the hollow pipe 7, attachable to a drill string or injection pipe 1, of the present valve assembly can start from 15 centimeters minimum, particularly from about 20 to about 1,250 centimeters and most particularly from about 250 to about 500 centimeter. The diameter of the hollow pipe housing the valve assembly is typically, but not limited to, about the same range as that for the drill pipe, and the materials are typically selected from the same type of materials as that for the drill pipe string as described above. Machining on the high-strength hollow pipe is limited to at least one, particularly from one to ten, more particularly from two to five, holes as exit ports which can be radial in orientation from the center of the hollow pipe. The size of the exit port(s) and flow port(s) is dependent on the various fluids or slurries being injected, as well as volumes and pressures. Illustrative non-limiting examples of suitable diameter for the ports are in the range of from about ⅟₃₂ inch to about ½ inch, preferably in the range of from about ⅟₁₆ inch to ¼ inch, and most preferably about ⅛ of an inch, plus or minus a fraction. Although a plurality of holes/ports work well and provide better results than tools currently available, as non-limiting examples, there can be from one to about ten, particularly about 3 to 5, or one to two strategically placed holes/ports. One illustrative example relates to a drill pipe attachment valve assembly having three holes of about ⅛ inch each drilled in the wall of the pipe equally spaced at about 120°.

The closed end of the hollow pipe can be permanently closed or sealed. In the alternative, it is closed by having a tip fitted therein by a method selected from (a) friction fit, (b) engaging via threaded portion and screwed on, (c) welding, (d) bolted on, and (e) combinations thereof.

As a particular embodiment of the present invention, there can be a stationary seat, fitted in the hollow pipe, in abutment against the inner wall of the hollow pipe, adapted to seat the slidable plug. As another embodiment of the present invention, the apparatus does not have any valve seat and the plug slides between the open end and the closed end within the hollow pipe.

Figure 4:
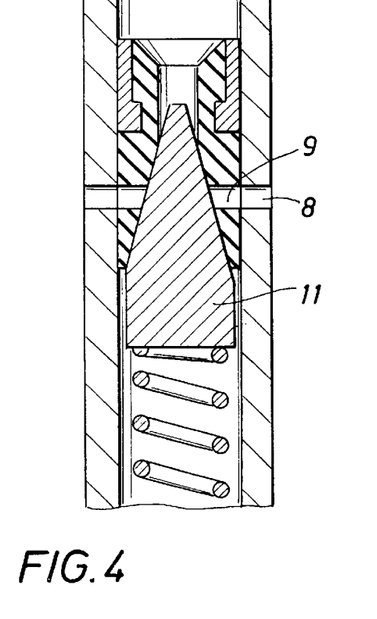
FIG. 4 is a fragmentary longitudinal cross-sectional view of the apparatus of FIG. 2 showing a specific arrangement for affixing a valve seat made of a soft material to the hollow pipe.

Both the plug and valve seat can be made of any suitable material. It can be made of a "hard" material such as metal, or a "soft" material softer than the hard material. Suitable metals as hard material include, but not limited to, those having a hardness less than that of the selected pipe material but greater than a Brinnell hardness of about 42, or equivalent, according to ASTM methods E10, E18, E93, and E140, as relevant, selected from those in Group IB, IIIA, IVA or VIII of the Periodic Table, or an alloy thereof, such as aluminum, copper, bronze, and alloys thereof. Preferred metals include metals or metal alloys that are strong enough to not deform under the pressures generated by the pump to depress the selected spring, but that permit machining. When a "soft material" is used, the material must be measurably softer than the hard material, but having a certain range of strength; it must be strong enough not to deform under pressure, but soft enough to embed sand. The pressure it has to withstand could be as high as 10,000 pounds per square inch (psi) or as low as 5 psi, particularly from about 30 to about 600 psi. Suitable soft material include, but are not limited to, rubber, wood, polyolefins, plastics, such as, a high density polyethylene, Teflon®, and the like, preferably having an International Rubber Hardness Degree, according to ASTM D2240, ASTM1415, or ISO 48, consistent with material of hardness in the range of hard to medium-hard natural vulcanized rubber. Additionally, the movable plug is selected of a material with suitable properties to aid the sliding, contacting, and mating of the pipe and valve seat surfaces without spalling, gouging, or chipping of either of the mating or sliding surfaces, or contact freezing of the mating or sliding surfaces.

Where the apparatus comprises a valve seat, the materials for valve seat and the plug can be: (1) the plug is made of a hard material which is harder than the hard material of the valve seat, (2) both are made of hard material, but the valve seat is harder that the plug, (3) both are hard material of similar hardness, (4) the valve seat is made of a hard material and the plug is made of a soft material as illustrated in FIG. 5; or (5) the valve seat is made of a soft material and the plug is made of a hard material as illustrated in FIG. 4. As used herein, the hardness of the hard materials is determined in accordance to ASTM Methods E10, E18, E93, and E140 as relevant, or equivalents thereof.

As a particular embodiment of the present invention, there can be at least one sealing device (member) 15 fitted in the seat, plug, and/or the wall of the hollow pipe, adapted to improve seating between (a) the plug, (b) the pipe, and/or (c) the seat. The sealing device (member) can be in the form of a groove, fitted with (a) an o-ring, or (b) a mechanical seal such as a piston ring.

As a particular embodiment of the present invention, the present apparatus comprises a valve seat which is frictional fit (interference fitted) into the hollow pipe by any suitable method known to one skilled in the art, such as using a mandrel press and heating the outer tube and cooling the valve seat. The seat has flow port(s) which are aligned with the exit port(s) in the peripheral wall of the pipe, wherein when the plug is at a non-blocking open position, the fluid for injection received from the open end of the pipe is permitted to exit the pipe through said flow port(s) in the seat and the exit port(s) in the peripheral wall of the pipe; wherein when the plug is engaged with the seat in said blocking position, it closes both the flow port(s) in the seat and the exit port(s) in the wall to prevent any material from entering into the pipe from outside of the pipe through said port(s).

In another particular embodiment of the present inventive apparatus as demonstrated in FIGS. 5 and 7, the exit port(s) 10 in the wall of the hollow pipe is located below the valve seat. When the plug is at a blocking position, the exit port(s) 10 in the peripheral wall of said pipe is blocked by the plug, and the plug closes the passage 14 to the open end, thereby preventing any more fluid from entry to the passage 14. Where the plug is tapered, the exit ports are blocked by the straight section 11 or large-diameter portion of the plug, and not in contact with the tapered portion 12 of the plug.

The valve is completely protected within the hollow pipe; there is no exposure to soil or rocks during use. The shape of the valve seat can vary. As shown in the FIGS. 2–7, the valve seat is tapered such that the diameter or the center passage increases toward the closed end or lower end of the drill pipe. It can also be cylindrical in shape. In any case, the valve seat is angled exactly to fit the portion of the plug facing the open end.

The shape of the plug can contribute to the efficiency of the design. Illustrative and non-limiting examples of the shape include (a) cylindrical and uniform in diameter throughout the entire length of the plug, (b) cylindrical but tapered and extending toward the valve seat, and others.

Where the plug is tapered, the end of said plug facing the open end is tapered and merges into a large-diameter portion which can come into slidable contact with the peripheral wall of said pipe; and said seat is concave and adapted to seat the tapered plug at the tapered end, and the plug and seat can have surfaces mating to each other with sufficient surface contact to prevent fluid flowing therethrough; the plug has a larger surface area, for example, extending up through the valve seat in a conical shape so that the fluid pressure can be exerted on the increased surface area of the plug. The operator of the injection system can effectively use less pump head pressure to actuate the valve to obtain the same result. In this configuration, when the pump pressure is decreased the full force of the spring is used to reseat the piston valve into the valve seat before soils can enter the drill string.

The outer diameter of the largest diameter section of the plug is clearance or friction fit to the inner diameter of the hollow pipe. By clearance or friction fit, it means that the difference between the inner diameter of the hollow pipe and that of the largest diameter portion of the plug is nominal or from about 0.001 to about 0.02 inches, particularly from about 0.002 to about 0.1 inches.

A resilient member, such as a mechanical or pneumatic spring, is held in place between the slidable plug and the closed end of said pipe. The resilient member (means) continuously urges the plug in a direction away from the closed end, wherein said resilient member is designed to push the plug to a position blocking the exit port(s). When pressure exerted by the resilient member onto the plug toward the direction of the open end exceeds fluid pressure exerted onto the surface of the plug facing the open end toward the direction of the closed end, the plug slides toward said open end to a blocking position and the exit port(s) in the peripheral wall of the pipe is closed by the plug thereby preventing flow of fluids between the inside of the pipe and the outside of the pipe, and the plug also closes the passage to the open end thereby preventing fluids to be injected from entry into the injection apparatus; and when the fluid pressure exerted onto the surface of the plug facing the open end exceeds the pressure exerted by the resilient means toward the open end, the plug disposes to a non-blocking position and said exit port(s) is open to allow fluid to flow from within the pipe to outside the pipe.

Where the apparatus does not have a stationary seat, the spring is designed to push the plug to rest at a position blocking the exit port(s) when the actual differential pressure P' is less than "design differential pressure value "P"; and at a P' exceeding P, excess fluid pressure forcing the axial plug sliding toward the closed end. A "differential fluid pressure" means the pressure difference from the top of the pipe (such as point 13 in FIG. 2 if FIG. 2 did not have a valve seat) minus that at the exit port(s) (such as point 8 in FIG. 2 if FIG. 2 did not have a valve seat). The "design differential pressure value "P" is the pressure at which the spring is designed to rest at a position blocking the exit port(s), and it is selected from a pressure ranging from about 2 to about 5,000 psi, particularly from about 5 to about 600 psi and more particularly from about 10 to about 200 pounds per square inch (psi). Where there is a stationary seat, the spring is designed to seat the axial plug against the valve seat at a selected designed differential fluid pressure level, P, of from about 2 to about 5,000 psi, particularly from about 5 to about 600 psi and more particularly from about 10 to about 200 pound per square inch (psi). The actual differential pressure P' is the pressure difference from that above the valve seat minus that at the exit port(s), and at a P' being less than P, excess spring force is taken by the mating axial plug and valve seat surfaces; excess spring force being sufficient to ensure bubble-tight sealing between the mating axial plug and valve seat surfaces, this being identified as a closed "blocking" position; at a P' being greater than P, excess fluid pressure forcing the axial plug toward the closed end, thusly separating the mating axial plug and valve seat surfaces, continuously urging said axial plug toward the closed end within the pipe, the sliding plug progressively exposing the exit ports/holes in the pipe wall, allowing fluid flow from within the pipe to exit through the pipe exit port(s)/hole(s), this being identified as an open flow non-blocking position.

At differential pressures greatly exceeding the design value, P, fluids flow continuing to exit the fully exposed exit ports in an open flow non-blocking position, and the sliding plug being continuously urged toward the closed end against increasing spring force, to a final axial plug position at which the spring is at a fully compressed position either fixed by an optional internal stop mounted within the closed end of the pipe, or for a helical mechanical spring, with the coils of the spring fully compressed against each other, further excess pressure thusly being unable to exceed the design force of the spring and eliminating irreversible damage to the spring due to over-tensioning. From an open flow position, with actual differential pressures exceeding the design value P, and fluid exiting the pipe exit port(s)/orifice (s), a decrease in actual differential pressure allows the spring force to urge said plug to move in a direction toward the open end, the mating sliding surfaces of the sliding plug and internal pipe surface wipes possible fouling, matter, and debris from the exit port(s) as said plug continuously slides toward the open end toward a closed position. The composition and required strength coefficient of the spring depend upon the amount of force required to compress, the type and volume of slurry to be injected and the pressure to be exerted, and the soil and water conditions.

In addition, in most uses the reduction in pressure is not immediate; it takes, for example, from less than 2 to about 9 or 10 seconds for the injected fluid to dissipate into the surrounding soils and the pressure of the injected fluid in soil to decrease, depending primarily on the permeability and capacity of the surrounding soils, as well as other factors. The spring has to be able to react to the constantly changing pressure and close the valve.

Suitable materials for the spring include, but not be limited to, spring steel, metal alloys or steel containing percentages of various metals in amounts that give the spring the required strength for the objective and conditions to be encountered. A stiffer spring is suitable where pressure needs to be maintained because of surging sands in an aquifer or fluidized soils because of injections. And a lighter spring is suitable where it is desirable to inject fluids above or below an aquifer that does not have surging sands and is made of a soil containing mostly clays.

A spring stop within the spring may be added to prevent over pressurizing the spring or excessive plug travel.

In assembly, the closed end of the pipe is initially kept open, and the plug is inserted into from the pipe from this end, backed by a resilient means, such as mechanical or pneumatic spring, followed by closing this end, such as having a tip screwed in.

In operation, in an initial position, before pressure is asserted by bacterial slurry to be injected, the plug is usually resting at a blocking position and the exit ports are closed. The injection of bacterial slurry pushes the plug toward the closed end, and where there is a valve seat the bacterial slurry or fluid pressure unseats the plug and bacterial slurry flow out of the exit ports/holes in the peripheral wall of the pipe. When injection pressure is relieved, the spring pushes the plug toward the open end (and where there is a valve seat, it reseats the valve) in a position to close the exit port(s) to prevent backflow. Furthermore, the plug is adapted to close the passage to the open end thereby preventing any fluid, to be injected, from entry into the injection apparatus.

For underground injection, the present injection apparatus is often connected to a drill string pipes, and hammered to the desired depth, for example by a Geoprobe direct-push rig. Bacterial sludge to be injected can be pumped from a storage tank at a rate of from about 5 gallons per minute to about 200 gallons per minute, particularly from about 10 gallons per minute to about 50 gallons per minute, at a pressure from about 5 psi to about 10,000 psi, particularly from about 30 psi to about 600 psi into the upper end of the drill sting pipe. The injection pressure pushes the plug downward, and fluids such as biomass flows out of the exit port(s) in the pipe. When the injection pressure is relieved, the plug slides back to the blocking position or the plug reseats, thus preventing backflow into the injection ports and drill pipe thereby avoiding clogging the exit ports and the pipe with soil particles. Furthermore, the plug is adapted to close the passage to the open upper end, thereby preventing any fluid, to be injected, from entry to the injection apparatus. Subsequently, the pipe is often hammered to the next deeper injection area or withdrawn upward, and the process is repeated. This makes it possible to continue to inject while moving up or down.

The inventive injection apparatus provides a number of advantages over anything currently available in the art:

1. A fluid column can be maintained in the entire injection pipe and the present injection apparatus while in soil, even at a significant depth, while pump connections and injection pipe extensions are changed at the surface.
2. The design prevents backflow of soil and sand which clogs all sizes of drill pipes when they are exposed to flowing soils or an attempt is made to go to greater depths.
3. The valve assembly is closed at the lower end, optionally uses a permanent tip, and saves the expense of continually replacing disposable tips.
4. Since the lower end of the valve assembly is closed, optionally by a tip 6 which stays in place, the apparatus can be moved up and down to various depths in the soil without interruption of the injection process.
5. The apparatus can be operated in either continuous injection flow or intermittent injection flow, depending on selection of spring rate constant, injected fluid properties, soil type, and value geometry.
6. The apparatus can be used with a range of equipment such as (a) direct-push technology (Geoprobe™) that can be transported on a vehicle as small as a pick up truck or garden tractor to (b) large diameter hollow stem auger drilling equipment with large motive force generators, such as in on-shore or off-shore drilling operations for injecting fluids, grouts, cements, etc.

7. The apparatus contains only two moving parts, the plug 3 and the spring 4, and is easily disassembled, cleaned and reassembled.

8. The valve/plug and spring are isolated from direct contact with soils outside the pipe.

9. The apparatus is designed to deliver bacterial slurry effectively to distribute well through the treated zone in a fast enough fashion to prevent settling of the culture in the delivery system to prevent plugging of the apparatus, preferably sufficiently fast with sufficient pressure to reach the treatment area far enough from the injection site, more preferably with sufficient pressure and/or speed to alter/fracture/crush the soil structure to create channels for the bacterial to reach out farther in the treatment zone. It is critical that sufficient culture be delivered initially as it is not typically expected that the degrading activity in the treatment zone will increase with time.
10. The apparatus/tool can be operated effectively in surging sands and flowing soils. This has not been possible previously with tools available in the art that allow the sands to shoot to the surface through hollow pipes, or completely clog all fluid passageways.

The present remediation can be achieved with great success by using a network of oxygen delivery wells operated intermittently so as to maximize aerobic biodegradation without causing significant losses from other non-degrading mechanisms (e.g. volatilization, dispersion, etc.) Referring to FIG. 1, the invention comprises one or more sources of oxygen-containing gas 1 connected to one or more subsurface gas injection points via injectors 109. Oxygen-containing gas delivery is used to create one or more well-oxygenated zones in the aquifer conducive to aerobic biodegradation. Within these aerobic zones, a bacterial culture capable of degrading the oxygenate chemical contaminant(s), specifically alkyl ethers/alcohols, more specifically MTBA and/or TBA is delivered. Contaminated groundwater, specifically contaminated with alkyl ethers (such as MTBE) and/or TBA flows from contaminated aquifer soils to the treatment zones 123. As contaminated groundwater passes through this treatment zone, it is purified by biodegradation, and the toxic alkyl ethers/alcohols such as MTBE and TBA are converted to non-toxic substances such as carbon dioxide and water.

Also referring to FIG. 1, the oxygen-containing gas sources may be housed in enclosures. The oxygen-containing gas sources may be comprised of air compressors, blowers, or combinations thereof with pressurized gas storage tanks 105. The oxygen gas sources may also be comprised of commercially-available oxygen gas generators.

The oxygen-containing gas delivery systems must be designed so as to maintain relatively uniform aerobic conditions in the treatment zones 123, without causing significant contaminant loss through non-biodegradation loss mechanisms, such as volatilization and dispersion. The loss of contaminant(s) from volatilization (such as migration to the unsaturated zone) is typically less than 50%, preferably less than 20%, more preferably less than 10%, and still more preferably less than 7% by weight.

One non-limiting way for achieving this involves the intermittent pulsed injection of an oxygen-containing gas, such as air or pure oxygen. Thus, pulses of oxygen-containing gas are delivered through the injectors 109. When operated in this fashion, a portion of the oxygen-containing gas becomes trapped in the aquifer pore spaces and oxygen continuously dissolves into groundwater during the time period between injection pulses. Thus, oxygen is continuously delivered between pulses. In addition, pulsed gas delivery is critical as continuous delivery can cause reductions in water permeability to the extent that contaminants flow around, rather than through, the treatment zone. FIG. 1 depicts one embodiment of an apparatus for delivering oxygen-containing gas in an optimized intermittent mode. First, the desired injection pressure of the oxygen-containing gas is controlled with gas pressure regulators. The injection pressure must be greater than the hydrostatic head of water in the injectors 109; which is roughly 0.5 psig per foot of depth between the water table elevation and the top of the perforations in the oxygen delivery well. To eliminate the poor gas distribution problems that plague manifolded gas delivery wells, it is important that the delivery pressure be at least 5, and preferably at least 10 psig greater than the hydrostatic head of water. Illustrative examples of delivery pressures are in the 20–40 psig range. One or more gas storage tanks 105, are used to store the oxygen-containing gas between injection cycles. The gas storage tanks 105 are sized to contain the desired gas injection volume at the desired gas injection pressure. The gas storage tanks allow the short and rapid pulsed delivery of gas not achievable by wells directly connected to blowers, compressors, or other oxygen-generating equipment. Solenoid valves and back-flow check valves control the flow of gas from the oxygen-containing gas source and to the injectors.

System monitoring and control is integral to optimal operation of this invention. System monitoring is typically comprised of a collection of pressure gauges and gas flow meters that are used to ensure gas delivery to each injector is occurring. At a minimum, pressure gauges are needed for each gas storage tank. In addition, groundwater monitoring points 110 and dissolved oxygen sensors 108 are used to monitor dissolved oxygen concentrations in the target treatment zone. Based on this data, the frequency and volume of oxygen-containing gas injections is adjusted through use of the controller 119. This controller may be a simple system of manual valves, but more often will involve electronic timers, and may even involve more complicated automatic control systems integrated with in-situ oxygen sensors.

Gas injectors 109 are typically, but not limited to, constructed from a combination of perforated 122 and non-perforated conduit 121. The non-perforated conduit 121 must extend to or below the target treatment zone 123, and must be installed so as to prevent the short-circuiting of oxygen-containing gas to the vadose zone 117. The perforated section 120 of the injector 109 must be placed in or below the target treatment zone 123, but may be aligned either vertically or horizontally, or both vertically and horizontally. If aligned vertically as shown in FIG. 1, the perforated section is usually not much longer than a few feet.

As one aspect of the present invention, the dissolved oxygen concentration (DOC) in the aquifer treated (treatment zone 123) is increased to greater than 2 mg/L in the aquifer (groundwater) treated zone, preferably greater than 4 mg/L and more preferably more than 8 mg/l, and still more preferably greater than 18 mg/L within less than 40 Days, preferably within less than 30 days, more preferably within less than 20 days, still more preferably within less than 14 days of gas injection. Dissolved oxygen concentrations up to about 8 mg/L can be achieved through air or oxygen gas delivery; higher dissolved oxygen concentrations require pulsed oxygen gas delivery.

The pressure of the oxygen-containing storage tanks 105 is at least 5, preferably 10, more preferably more than 20 psig, and still more preferably more than 30 psig above the hydrostatic pressure at the injection point. As a non-limiting illustrative example, the hydrostatic pressure at the injection point is calculated to be about 0.5 psig per ft. of depth below the water table. At a typical treatment zone, the injection points are at the depth of about 5–20 ft, preferably about 5–10 ft, below the water table. The hydrostatic pressure at the injection points is 2.5–10 psig. The injection (storage tank) pressure could then be at least 7.5–15 psig, and preferably greater than 22.5–30 psig. The injection pressure can be 6–60 psig.

To ensure adequate oxygen delivery, the space between the oxygen-containing gas injection points is typically less than 20 ft, and preferably less than 10 ft, and more preferably less than 7 ft, and still more preferably less than 6 ft. As a non-limiting example, the spacing between adjacent injection points can be about 1–10 ft apart, particularly about 4–5 ft apart, particularly in a shallow (<30 ft depth), relatively homogenous aquifer.

As one aspect of the present process, the minimum average volume (Vmin—given in cubic feet of gas measured at ambient temperature and ambient pressure) of total oxygen injected each time at each injecting point can be calculated by the following formula:

$$Vmin = 0.1 \times A \times B \times P \div N$$

Wherein, A=treated area (square ft)
B=treatment thickness (ft)
P=porosity
N=number of injection points The volume of oxygen injected is about 1–100, preferably 1.25–20, and more preferably 1.25 to 3 times of "Vmin". "P" is the porosity and is typically a value between about 0.25 to about 0.45 and the standard values of P vary with the aquifer material, which can be looked up in reference books generally known to one skilled in the art.

It is understood that when the oxygen-containing gas is not a relatively pure oxygen, such as air, the volume of gas injected shall be adjusted according to the oxygen content of the oxygen-containing gas.

As an illustrative non-limiting example, a 100 square ft by 12 ft treatment zone with 30 oxygen injection point will require at least about 4, preferably 5–8, more preferably 5–7 cubic feet (based on measurement at ambient pressure and temperature) of oxygen per injection point.

The frequency for oxygen-containing gas injection will be variable and adjusted on a site-specific basis. Typically it is from about once a week to about 10 times per day, specifically from about once a day to about 8 times a day, more specifically from about 2 times day to about 4 times a day. The duration of each injection of oxygen-containing gas at each injection points lasts from about 0.05 to about 4 minutes, preferably from about 0.1 to about 3 minutes, still more preferably from about 0.3 to about 2.0 minutes. As an illustrative non-limiting example, oxygen-containing gas is injected at each injection site at about 1 to about 20, specifically from about 2 to about 10, more specifically from about 3 to about 8 cubic feet per minute (based on the volume at ambient pressure) for from about 0.1 to about 3 minutes. As a specific illustrative example, the oxygen-containing gas is injected at the injection point (well) at about 4 cubic feet per minute (i.e. 260 cubic feet per hour) for 0.5 to 1 minute for each injection.

As an embodiment of the present invention, to maximize aerobic degradation and not cause significant loss of contaminant(s) by evaporation and dispersion, the injection frequency and volume at each injection point have the relationship according to the following equation:

$$e^{[(-V \times F \times N \times H)/(W \times B \times Q)]} > 0.5$$

Wherein:
e=natural exponential
V=volume of gas injected at each injection point (ft3)
F=frequency of injections (number of injections per day)
N=number of gas injection points
W=width of treatment zone perpendicular to groundwater flow path (ft)
B=vertical thickness of treatment zone (ft)
Q=specific discharge of groundwater to treatment zone (ft/day)
H=Henry's Constant for contaminant of interest ((mg/L-water)/(mg/L-air))

Where conditions satisfy the equation above, less than 50% of the contaminant is volatilized and/or dispersed by the gas delivery process. Preferably, $e^{[(-V \times F \times N \times H)/(W \times B \times Q)]}$ is greater than 0.80, more preferably greater than 0.90, and still more preferably greater than 0.93.

As an illustrative example, the design and operating conditions in a test plot are as follows:
V=2.5 ft3/well
F=4 injections per day
N=21 wells
W=20 ft
B=10 ft
Q=0.3 ft/day)
H=0.02 (mg/L-water)/(mg/L-air)
Under these conditions:

$$e^{[(-V \times F \times N \times H)/(W \times B \times Q)]} = 0.93$$

Under the above conditions, the test plot can achieve adequate oxygenation for biodegradation while maintaining only less than 10% loss (or even less than 7% loss) of contaminants by evaporation and/or volatilization.

Groundwater monitoring points 110 are also constructed from perforated and non-perforated conduit. In this case, it is important that the perforated conduit section be limited to the depth interval of interest for monitoring. Dissolved oxygen sensors 108 may be placed in-situ, in the groundwater monitoring points, or above-ground. If above-ground, they will be coupled with a groundwater pumping system for bringing small quantities of groundwater above-ground from the groundwater monitoring wells 110. Groundwater monitoring points placed down-gradient of the target treatment zone will also be used to monitor the disappearance of the alkyl ethers and TBA.

The invention will be illustrated by the following illustrative embodiments which are provided for illustration purpose only and are not intended to limit the scope of the instant invention.

Illustrative Embodiments

The following illustrative embodiments describe one application of this invention.

This invention is to be tested at a site contaminated with MTBE. At this site the target treatment zone is roughly 5-ft wide×150-ft long×30-ft deep (which is from about 10 ft below the surface to about 40 ft below the surface) in accordance to the following procedure.

The oxygen delivery system consists of about 60 oxygen injectors. Each is constructed from nonperforated ¾-inch diameter PVC pipe to which is attached either a 2-ft or 1-ft perforated section at the end. The injectors are installed using commercially-available direct-push well installation methods. The injectors are distributed roughly about every five feet in two levels. Perforated sections of the first level injectors are placed from about 17–19 ft below ground surface (hereinafter referred to as "shallow oxygen delivery wells") and that for the second level were placed from 30–35 ft below ground surface (hereinafter referred to as "deep oxygen delivery wells").

The oxygen gas source is a commercially-available oxygen gas generator capable of generating up to 80 SCFM (standard cubic feet per minute). It is connected via a sequence of timers, pressure regulators, and solenoid valves to eight gas storage vessels. Each storage vessel has an internal volume of roughly 2.5 cubic feet; when pressurized to 30 psig, each contains approximately 8 cubic feet of pure oxygen gas (based on volume at ambient pressure and ambient temperature). Each storage vessel is connected via electronic solenoid valves to three to five oxygen delivery wells. Timers are set so that oxygen gas could be delivered anywhere from one to eight times per day. Each oxygen gas storage tank is connected to 2 to 4 wells, and typically fully discharged in about 0.5 to about 1 minute.

The operation of the oxygen delivery system is initiated and oxygen is injected for about 14 days to reach a dissolved oxygen concentrations in the treatment zone of over 20 mg/L (or 25 mg/L) prior to the injection of MTBE degrading bacterial sludge.

Mixed culture BC-4 containing roughly 2000 mg-TSS/L (total suspended solids per liter) is injected into this zone through rigid pipe having an injection apparatus of the present invention. Injections are made approximately every 2-ft along the length of the treatment zone. The pipe strings are driven down to the bottom of the target treatment zone and then slowly raised as the mixed culture is injected under pressure for about every 2 ft rise of the injection apparatus. Approximately 2–8 gallons of mixed culture are injected for every 2-ft rise of the injection apparatus.

A slurry injection apparatus of present invention is screwed onto the lower end of a Geoprobe (TM) drill string. The drill string consists of 4 ft sections of 1.25-inch outside diameter, 0.625 inch inside diameter high carbon steel threaded at each end with mating female and male pipe threads. A Geoprobe direct-push rig is used to advance the pipe to the desired depth.

The injection apparatus is designed and constructed as illustrated in FIG. 5. The hollow pipe is made of high carbon steel, the same as the attached drill pipe. It is approximately 14 inches in length, 1.25 inches outside diameter, 0.625 inches inside diameter, with an internal female threaded section at the lower end and a external male threaded section at the upper end. A cylindrical brass valve seat is constructed, of nominal 0.625 inches outside diameter, with a 0.375 inch diameter center hole through the cylindrical axis, and, at the lower end, an axially concentric concave conical tapered seat, 1 inch in length along the axis, 0.375 inches in diameter at the inner narrow end and 0.5 inch diameter at the outside bottom end of the cylinder. The valve seat is friction fitted into the drill pipe with a mandrel press, to a location with the top of the seat 2 inches from the upper pipe end. Three radial 0.125 in. holes are drilled through the pipe wall, equally spaced at 120° around the circumference, 0.375 inches below the lower end of the machined brass valve seat. A cylindrical tapered plug constructed of ultra high molecular weight polyethylene, is machined in a shape in the tapered section to mate with the valve seat, and had a final total length of 2-in. A selection of helical steel springs of 0.5 inch outside diameter and uncompressed lengths of 4 to 8 inches, with rated collapse force in the range of 25 to 600 pounds, are used in testing the operation. This range of springs provides a design pressure level, P, for valve opening, in the range of approximately 6 PSI to 800 PSI.

In assembly, the tapered plug is inserted into the lower end of the pipe, backed by a helical coil spring, and a threaded carbon steel drive tip is screwed into the lower end of the assembly, which holds the plug and spring in place.

The oxygen gas delivery is under the following conditions
$$e^{[(-V \times F \times N \times H)/(W \times B \times Q)]} = 0.93$$
wherein: $V = 2.5$ ft3/well $F = 4$ injections per day $N = 60$ wells $W = 150$ ft $B = 30$ ft Following BC-4 seeding and continued operation of the $O_2$ injection system for the next 67 days, decreases in MTBE concentrations are expected to be observed in the BC-4+$O_2$ injection plot. Immediately down-gradient of the BC-4 seeded zone MTBE concentrations is expected to decrease >90. The bacterial slurry injector will operate without back flow and clogging of soils into the injection pipe.

The ranges and limitations provided in the instant specification and claims are those which are believed to particularly point out and distinctly claim the instant invention. It is, however, understood that other ranges and limitations that perform substantially the same function in substantially the same manner to obtain the same or substantially the same result are intended to be within the scope of the instant invention as defined by the instant specification and claims.

What is claimed is:

1. A method for in-situ remediation of an aquifer having a treatment zone through which passes water contaminated with at least one chemical contaminant which method comprises:

a) delivering to the treatment zone a microbial culture capable of degrading at least one chemical contaminant present in said aquifer using an apparatus comprising:

a pipe with a diameter of from about to about 0.6 to about 36 cm having (a) from one to ten exit ports in the peripheral wall, each port being from about 3 mm to about 5 cm in effective diameter, (b) an open upper end adapted to receive fluid to be injected, and (c) a closed bottom end;

an axial plug coaxially disposed concentrically inside said pipe and adapted to slide up and down inside the pipe, wherein said plug is tapered at the upper end and having an upper surface adapted to be acted on by the pressure of the fluid fed into said pipe;

a stationary seat, disposed inside the upper end of the pipe in abutment against the inner wall of said pipe, adapted to seat said slidable plug when the plug is disposed at a position blocking said port(s); and said seat is concave and adapted to seat the tapered plug at the tapered end, and the plug and seat have surfaces mating to each other with sufficient surface contact to prevent fluid flowing therethrough;

a mechanical or pneumatic spring held in place between said slidable plug and said closed bottom end of said pipe, said spring is adapted to continuously urge said plug in an upward direction away from said closed bottom end, wherein said spring is designed to seat the axial plug against the seat thereby closing said exit port(s) when the actual differential pressure P' is equal or less than a design differential pressure value P, wherein P is a pressure ranging from about 2 to about 5,000 pounds per square inch;

Wherein, at an P' greater than P, excess fluid pressure forcing the axial plug downward, thus separating the mating axial plug and stationary seat surfaces, continuously urging said axial plug downward within the pipe, the sliding plug progressively opening the exit ports in the pipe wall to a non-blocking position, allowing fluid flow from within the pipe to exit through the exit ports in the pipe;

optionally at least one groove, located (a) at the tapered section of said plug or (b) in the seat, having an o-ring inserted therein adapted to improve sealing between the plug and the seat; and optionally a spring stop within the spring to prevent overstressing the spring or excessive plug travel; and b) injecting, by at least two conduits, an oxygen-containing gas at a pressure of at least 5 psig above the hydrostatic pressure at injection points with injection frequency and volume at each injection point having the relationship according to the following equation:

$$e^{[(-V \times F \times N \times H)/(W \times B \times Q)]} > 0.50$$

Wherein:

e=natural exponential

V=volume of gas injected at each injection point (ft3)

F=frequency of injections (number of injections per day)

N=number of gas injection points

W=width of the treatment zone perpendicular to groundwater flow path (ft)

B=vertical thickness of treatment zone (ft)

Q=specific discharge of treatment zone to the treatment zone (ft/day)

H=Henry's Constant for contaminant of interest ((mg/L-water)/(mg/L-air)).

2. A method for in-situ remediation of an aquifer having a treatment zone through which passes water contaminated with at least one chemical contaminant which method comprises:

a) injecting, by at least two conduits, an oxygen-containing gas at a pressure of at least 5 psig above the hydrostatic pressure at injection points, wherein, the loss of contaminant(s) from volatilization is less than 50% by weight; and b) delivering to the treatment zone a microbial culture capable of degrading at least one chemical contaminant using an apparatus comprising:

a pipe having:

(a) an open end adapted to receive fluid, (b) at least one exit port(s) in the peripheral wall, (c) a closed end;

a plug coaxially disposed concentrically within said pipe and adapted to slide inside the pipe between the open end and the closed end, and a resilient member held in place between said slidable plug and said closed end, said resilient member continuously urging said plug in a direction away from said close end toward said open end;

wherein (a) when pressure exerted by the resilient member onto the plug toward the direction of the open end exceeds fluid pressure exerted onto the surface of the plug facing the open end toward the direction of the closed end, the plug slides toward said open end to a blocking position and the exit port(s) in the peripheral wall of the pipe is closed by the plug thereby preventing flow of fluid between the inside of the pipe and the outside of the pipe; and (b) when the fluid pressure exerted onto the surface of the plug facing the open end exceeds the pressure exerted by the resilient member toward the open end, the plug disposes to a non-blocking position and said exit port(s) is open to allow fluid to flow from within the pipe to outside the pipe.

3. The method according to claim 2, wherein said contaminant is an oxygenate chemical; wherein the contaminant loss from volatilization is less than 10% by weight and wherein said pipe having fitted therein a stationary seat in abutment against the inner wall of said pipe, disposed to seat said slidable plug when the plug is positioned at a blocking position.

4. The method according to claim 2, wherein the contaminant is selected from the group consisting of (a) methyl-t-butyl ether (MTBE), (b) t-butyl alcohol (TBA), and (c) a mixture thereof; wherein at least a portion of the contaminant is degraded to carbon dioxide by said microbial culture.

5. The method according to claim 2, wherein the dissolved oxygen concentration in the treatment zone is greater than 2 mg/L, wherein said seat has flow port(s) which are aligned with the exit port(s) in the wall of the pipe, wherein when the plug is at a non-blocking open position, fluid received from said open end is permitted to exit the pipe through said flow port(s) in said seat and said exit port(s) in the peripheral wall of the pipe.

6. The method according to claim 2, wherein the volume of oxygen-containing gas injected each time at each injection point contains from about 1 to about 100 times of minimum average volume (Vmin) in cubic feet of total oxygen, measured at ambient temperature and ambient pressure, Wherein Vmin can be calculated as:

$$V min = 0.1 \times A \times B \times P \div N$$

Wherein A=treated area (squareft)

B=treatment thickness (ft)

P=porosity

N=number of injection points.

7. The method according to claim 2, wherein said bacterial culture is delivered to the treatment zone by a network of a plurality of delivery conduits at a pressure of at least 10 psig greater than the hydrostatic head pressure at point(s) of injection.

8. The method according to claim 2, wherein (a) said plug is cylindrical and uniform in diameter throughout the entire length of the plug, and (b) said plug is adaptable to close the exit port(s) when disposed in the blocking position, and wherein the outer diameter of said plug is clearance fit to the inner diameter of said pipe.

9. The method according to claim 2, wherein said closed end is closed by having a tip fitted therein, wherein said tip is fitted into the end of said pipe by a method selected from (a) friction fit, (b) engaging via threaded screw, (c) welding, (d) bolted on, and (e) combinations thereof.

10. The method as claimed in claim 2, wherein there is at least one sealing device fitted in the wall of the pipe, seat and/or plug, adapted to improve sealing between (a) the plug, (b) the pipe and/or (c) seat.

11. The method according to claim 2, the oxygen-containing gas is injected to the aquifer by at least two gas injectors having respective perforated sections located at least two different depths within the aquifer.

12. The method according to claim 2, wherein the oxygen-containing gas is injected to the aquifer by a plurality of gas injectors spaced less than 10 ft apart.

13. The method according to claim 2, wherein each injection of oxygen-containing gas at each injection point lasts from about 0.05 to about 4 minutes.

14. The method as claimed in claim 2, wherein both said microbial culture and said oxygen-containing gas is delivered through the same conduit(s) to the treatment zone.

15. An apparatus for injecting fluid underground, which apparatus comprises:

a pipe with a diameter of from about to about 0.6 to about 36 cm having (a) from one to ten exit ports in the peripheral wall, each port being from about 3 mm to about 5 cm in effective diameter, (b) an open upper end adapted to receive fluid to be injected, and (c) a closed bottom end;

an axial plug coaxially disposed concentrically inside said pipe and adapted to slide up and down inside the pipe, wherein said plug is tapered at the upper end and having an upper surface adapted to be acted on by the pressure of the fluid fed into said pipe;

a stationary seat, disposed inside the upper end of the pipe in abutment against the inner wall of said pipe, adapted to seat said slidable plug when the plug is disposed at a position blocking said port(s); and said seat is concave and adapted to seat the tapered plug at the tapered end, and the plug and seat have surfaces mating to each other with sufficient surface contact to prevent fluid flowing therethrough;

a mechanical or pneumatic spring held in place between said slidable plug and said closed bottom end of said pipe, said spring is adapted to continuously urge said plug in an upward direction away from said closed bottom end, wherein said spring is designed to seat the axial plug against the seat thereby closing said exit port(s) when the actual differential pressure P' is equal or less than a design differential pressure value P, wherein P is a pressure ranging from about 2 to about 5,000 pounds per square inch;

Wherein, at an P' greater than P, excess fluid pressure forcing the axial plug downward, thus separating the mating axial plug and stationary seat surfaces, continuously urging said axial plug downward within the pipe, the sliding plug progressively opening the exit ports in the pipe wall to a non-blocking position, allowing fluid flow from within the pipe to exit through the exit ports in the pipe;

optionally at least one groove, located (a) at the tapered section of said plug or (b) in the seat, having an o-ring inserted therein adapted to improve sealing between the plug and the seat; and optionally a spring stop within the spring to prevent overstressing the spring or excessive plug travel.

* * * * *